(12) United States Patent
Griffin, Jr.

(10) Patent No.: US 8,000,820 B2
(45) Date of Patent: Aug. 16, 2011

(54) ACCESSORY FOR PORTABLE ELECTRONIC DEVICE

(75) Inventor: Paul P Griffin, Jr., Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 749 days.

(21) Appl. No.: 11/779,886

(22) Filed: Jul. 19, 2007

(65) Prior Publication Data

US 2007/0260798 A1    Nov. 8, 2007

Related U.S. Application Data

(63) Continuation-in-part of application No. 11/286,610, filed on Nov. 23, 2005, now Pat. No. 7,647,129.

(51) Int. Cl.
*G06F 17/00* (2006.01)

(52) U.S. Cl. ............ 700/94; 710/303; 710/304

(58) Field of Classification Search .......... 700/94
See application file for complete search history.

(56) References Cited

U.S. PATENT DOCUMENTS

| | | | | |
|---|---|---|---|---|
| 5,938,742 A * | 8/1999 | Faddell et al. | | 710/9 |
| 6,195,718 B1 * | 2/2001 | Hennessy et al. | | 710/304 |
| 6,202,209 B1 * | 3/2001 | Bartholomew et al. | | 717/173 |
| 6,523,079 B2 * | 2/2003 | Kikinis et al. | | 710/303 |
| 6,636,918 B1 * | 10/2003 | Aguilar et al. | | 710/303 |
| 7,510,420 B2 * | 3/2009 | Mori | | 439/446 |
| 7,561,897 B2 * | 7/2009 | Karr et al. | | 455/561 |
| 7,680,459 B2 * | 3/2010 | Faltman et al. | | 455/63.3 |
| 2004/0231495 A1 * | 11/2004 | Huang et al. | | 84/601 |
| 2005/0086410 A1 * | 4/2005 | Landron et al. | | 710/303 |
| 2005/0111182 A1 * | 5/2005 | Lin et al. | | 361/686 |
| 2005/0157459 A1 * | 7/2005 | Yin et al. | | 361/683 |
| 2006/0052144 A1 * | 3/2006 | Seil et al. | | 455/575.1 |
| 2007/0010222 A1 * | 1/2007 | van Hoff et al. | | 455/179.1 |
| 2007/0083691 A1 * | 4/2007 | Keely et al. | | 710/303 |
| 2007/0093277 A1 * | 4/2007 | Cavacuiti et al. | | 455/566 |
| 2008/0288701 A1 * | 11/2008 | Ward et al. | | 710/303 |
| 2009/0011729 A1 * | 1/2009 | Ikeda et al. | | 455/127.1 |

* cited by examiner

*Primary Examiner* — Curtis Kuntz
*Assistant Examiner* — Paul McCord
(74) *Attorney, Agent, or Firm* — Hornkohl Intellectual Property Law PLLC; Jason L. Hornkohl

(57) ABSTRACT

A transmitting accessory includes a base dock for receiving a portable electronic device and a transmitter that is removably coupled to the dock. When the device and transmitter are mounted on the dock, the transmitter receives signals from the device through the dock and transmits the signals to a remote receiver. The transmitter can be decoupled from the dock and coupled directly to the portable electronic device when the device is removed from the dock such that the device and transmitter can be carried and function as a single unit. The user inputs of the portable electronic device can preferably be used to control functions of the accessory and the device's display to display the selected transmission frequency or channel of the transmitter.

11 Claims, 6 Drawing Sheets

ACCESSORY FOR PORTABLE ELECTRONIC DEVICE

CROSS-REFERENCES TO RELATED APPLICATIONS

This application is continuation-in-part of U.S. patent application Ser. No. 11/286,610 filed Nov. 23, 2005, now U.S. Pat. No. 7,647,129 which is hereby incorporated by reference, for an "IMPROVED DIGITAL MUSIC PLAYER ACCESSORY INTERFACE" for the invention by Paul P. Griffin, Jr.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Transmitters for digital music players that allow a user to transmit audio from the device to a remote receiver are known in the prior art. While these devices are widely used and popular devices, they suffer from a number of drawbacks. First, transmitters that hold and charge the device have attached cords and mounting portions that make the transmitters unusable when then player is being moved by the user or in a location where an outlet is not available. Portable transmitters lack the ability to charge the player and cover the connector through which a charger would be attached to the player. Thus they can not be used when the player is being charged. In addition, audio is transmitted from the transmitter to the receiver in analog form. Thus, the signal may become distorted by the transmission process and any interference present in the received analog signal is very difficult to remove or counter. A further drawback is that these analog devices cannot transmit data concerning the music such as title and artist from the music player to the remote receiver. Current analog transmitters are also not capable of communicating control signals between the device and the remote receiver. Therefore, what is needed is an improved transmitter for a portable electronic device that can be easily mounted in either a mobile or fixed configuration and transmit substantially interference free audio signals and control data to a remote receiver.

BRIEF SUMMARY OF THE INVENTION

An embodiment of the present invention is directed toward an accessory for coupling with a portable electronic device. The accessory includes a dock adapted to couple to the portable electronic device such that electrical signals can be received from the device with the dock. A transmitter is adapted to be coupled to the dock such that the transmitter can transmit data received by the dock from the portable electronic device to a remote receiver when the portable electronic device is coupled to the dock. The transmitter can be decoupled from the dock and coupled directly to the portable electronic device when the portable electronic device is decoupled from the dock such that the transmitter can transmit data received from the portable electronic device to the remote receiver. The transmitter automatically identifies an open frequency for transmitting the data to the remote receiver. The transmitter then configures the remote receiver to receive data on the particular channel or station. The transmitter instructs the portable electronic device to display a transmission frequency of the transmitter on a display of the portable electronic device. The transmitter detects manipulation of the user inputs of the portable electronic device and alters a function of the transmitter based upon the detected manipulation and the user inputs on the transmitter can be repurposed to control more than one function of the transmitter. The dock is adapted to receive power from a 12-volt outlet and charge the portable electronic device when the portable electronic device is coupled to the dock. The transmitter is a parasitic device that obtains power from the portable electronic device when the transmitter is coupled to the portable electronic device and from the dock when the transmitter is coupled to the dock. The housing of the transmitter is configured to be physically coupled to the housing of the portable electronic device such that the portable electronic device and the accessory can be carried as a single unit.

Another embodiment of the present invention is directed toward an accessory for use with a portable electronic device. The accessory includes a base having an input/output connector adapted to receive the portable electronic device and a transmitter. The transmitter has an input/output connector such that the transmitter can be indirectly coupled to the portable electronic device through the base when the portable electronic device is coupled to the base and directly connected to the portable electronic device when the portable electronic device is decoupled from the base. When the transmitter is directly coupled to the portable electronic device, the portable electronic device and transmitter can be carried as a single unit. The base includes a dock having a 12-volt adapter configured to be received in a 12-volt car outlet. The transmitter receives data from the portable electronic device and transmits the data to a remote receiver. The transmitter includes user inputs that allow a user to select a transmission frequency of the transmitter.

Yet another embodiment of the present invention is directed toward a transmitter for a portable electronic device. The transmitter includes an input/output connector for coupling the transmitter to a dock that receives the portable electronic device and couples the transmitter directly to the portable electronic device. Repurposing software detects manipulation of controls of the portable electronic device and alters a functionality of the transmitter based thereon. A pass through connector permits a second accessory to be coupled to the portable electronic device when the transmitter is coupled to the portable electronic device through the transmitter. A digital encoder encodes an analog signal received from the portable electronic device into digital data that is transmitted by the transmitter.

DETAILED DESCRIPTION OF THE INVENTION

Figure 1:
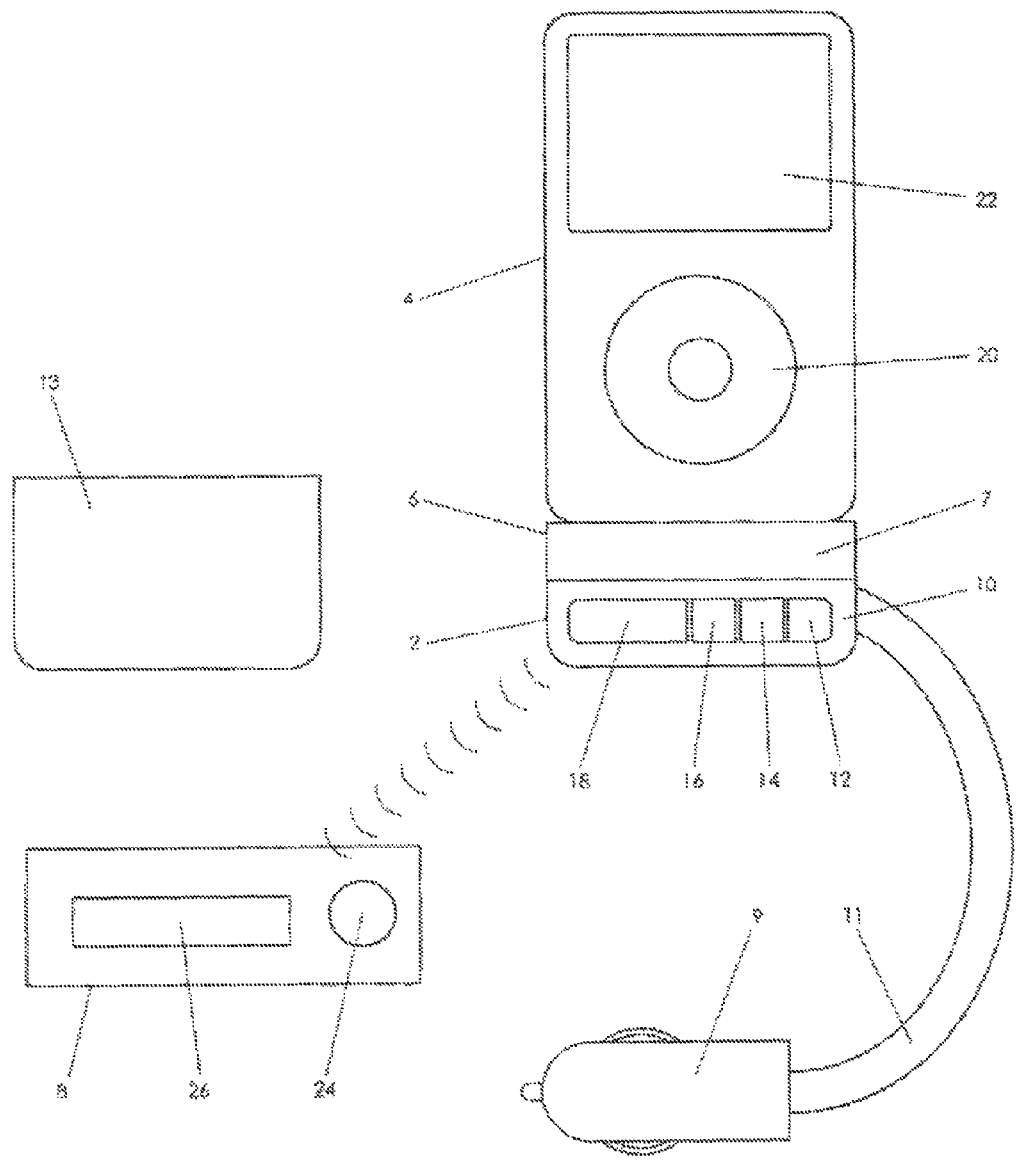
FIG. 1 is an illustration of an accessory constructed in accordance with an embodiment of the present invention coupled to a portable electronic device through a device dock adapted to be mounted in a 12-volt outlet.

The present invention is directed toward an accessory for a portable electronic device that transmits information between the portable electronic device and a remote receiver. An illustration of an accessory 2 constructed in accordance with an embodiment of the present invention coupled to a portable electronic device 4 through a device dock 6 adapted to be mounted in a 12-volt outlet is shown in FIG. 1. The accessory 2 is designed to couple with the portable electronic device 4 through the dock 6 such that digital or analog signals can be transferred between the device 4 and accessory 2 through the dock 6. The dock 6 has a first electrical connector that is adapted to couple to the device 4 and second electrical connector that is adapted to be coupled to the accessory 2. Preferably, the type of connector used by the dock 6 to couple to the device 4 is the same type of connector used to couple the accessory 2 to the dock 6. The particular type of connector, USB, 30 pin, barrel, etc., that is used to electrically and physically couple the dock 6 to the corresponding input/output connector of the accessory 2 and device 4 depends upon the type of input/output connector on the device 4 for which the accessory 2 and dock 6 are designed. The accessory connector 28 is visible in FIG. 3 which shows the accessory 2 decoupled from either the device 4 or dock 6. Electrical signals can be transferred between the accessory 2 and the device 4 through the device dock 6 when both the accessory 2 and the device 4 are properly coupled to the device dock 6.

The accessory 2 has a housing 10 that is designed to be coupled with the portable electronic device dock 6 such that the accessory 2 and the device dock 6 are securely held together as a single unit and electrical contacts between the device dock 6 and accessory 2 are established when the accessory 2 is mounted in the dock 6. In addition, the dock 6 has a housing 7 that is configured to hold the device 4 such that the accessory 2, device 4 and dock 6 all function as a single unit when coupled. Power supplied to the dock 6 through a 12-volt outlet adapter 9 is supplied to the accessory 2 and the device 4 by the dock 6. A flexible extension 11 arm connects the 12-volt adapter 9 to the upper mounting portion of the dock 6 which can be adjusted such that the displays 18 and 22 of the device and accessory are easily visible and their controls 12, 14, 16 and 20 readily accessible. The dock 6 is also preferably adjustable on two axes with respect to the flexible extension arm 11 such that the portable electronic device 4 and mounted accessory 2 can be turned in a counter clockwise or clockwise manner with respect to a right, left and forward/backward plane. This is accomplished through the use of a ball joint positioned between the dock 6 and the extendible arm 11. A removable case holder 13 may be provided that can be removably positioned on the lower portion of the dock 6 by the user to cover the buttons and display of the accessory 2 when it is mounted in the dock 6 if desired.

Figure 2:
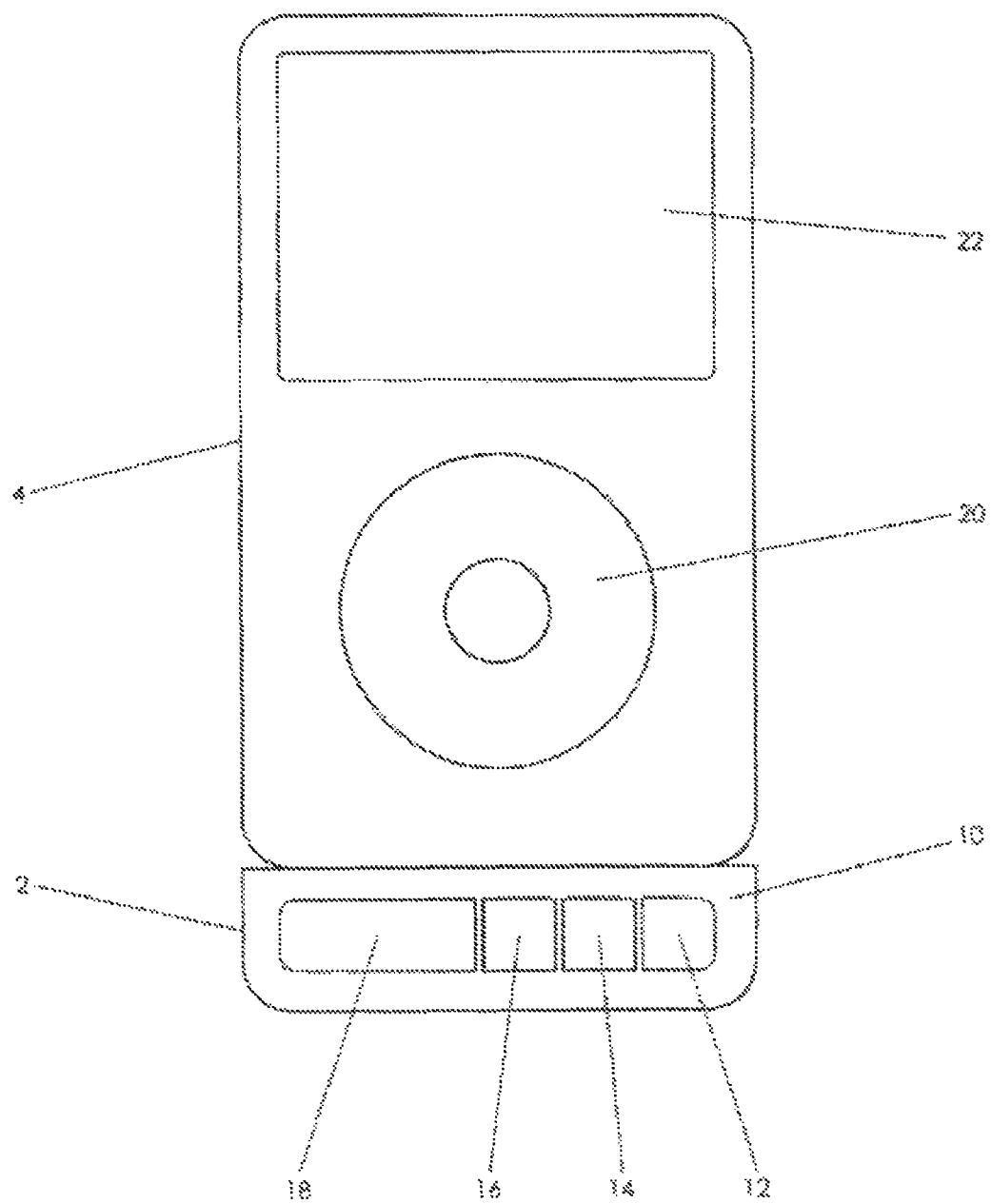
FIG. 2 is an illustration of an accessory constructed in accordance with an embodiment of the present invention coupled directly to the portable electronic device of FIG. 1.

In addition to being adapted to be coupled to the dock 6, the accessory 2 can be removed from the dock 6 and coupled directly to the device 4 as such that the accessory 2 and the device 4 function, and can be carried, as a single unit as shown in FIG. 2. This allows a user to use the accessory 2 with their device 4 whether they are charging the device 4 in their car with the dock 6 or carrying the device 4 by itself. Thus, the invention represents a substantial improvement over the prior art in terms of usefulness, efficiency and marketability.

Figure 3:
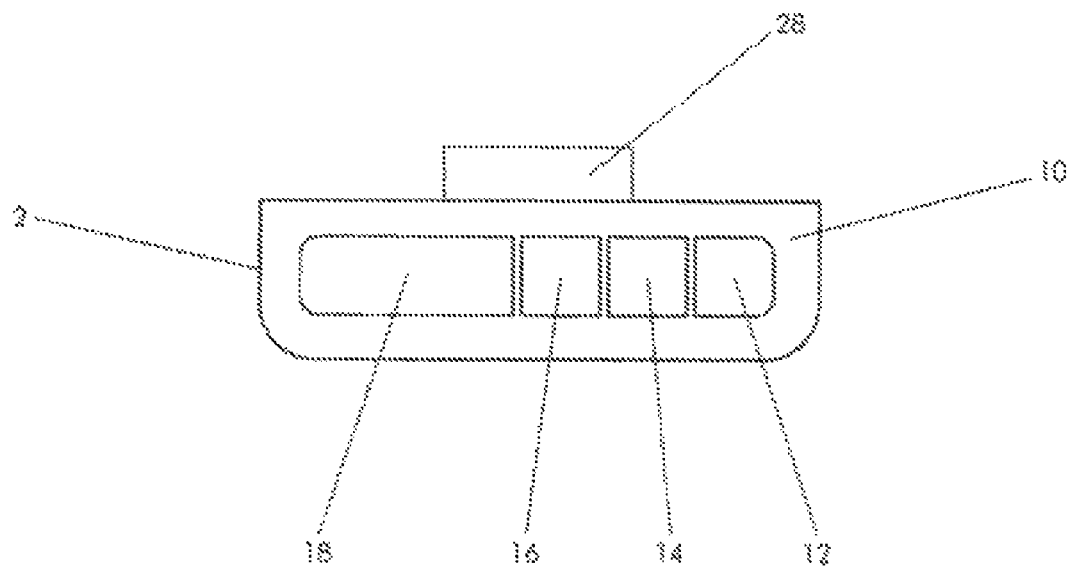
FIG. 3 is an illustration of an accessory constructed in accordance with an embodiment of the present invention coupled directly to the portable electronic device.

In the embodiment of FIGS. 1 through 3, the accessory contains a digital transmitter that allows data and signals received from the device 4 through the dock 6 to be transmitter to a remote receiver 8. User inputs 12, 14 and 16, and a display 18, are preferably provided on the accessory 2 itself that allow a user to select a frequency or channel on which to transmit the data received from the device 4 to the remote receiver 8 with the accessory 2. The accessory display 18 is preferably an organic light emitting device display (OLED) and the user inputs 12, 14 and 16 soft buttons. An unused channel or frequency is preferably selected by the user for transmission of digital data between the accessory 2 and the remote receiver 8 to minimize interference. However, the accessory 2 can also be configured to instruct the receiver 8 to search for a clear channel for the transmission if the receiver 8 is so equipped or provided with a receiver and search routine so that the accessory 2 locates the clearest channel for the transmission. The user inputs 12, 14 and 16 are preferably a small number of soft buttons that can be reconfigured to control the various functions of the accessory 2 such that the number of user inputs required by the accessory, and their associated costs, are minimized.

The accessory 2 can preferably write text to the portable electronic device's display 22 and the remote receiver's display 26 and repurpose the controls 20 of the portable electronic device 4 to control functions of the accessory 2, device 4 and receiver 8 as discussed in more detail below. In such an embodiment, the accessory 2 can digitally instruct the receiver 8 to tune to the frequency or channel selected with the controls 20 of the device 4. The accessory controls 12, 14 and 16 or device controls 20 can also be used to manipulate accessory 2 generated menus displayed on a display screen 18, 22 or 26 of the accessory 2, portable device 4 or receiver 8. By selecting the proper menus and selections, accessory 2, device 4 and receiver 8 functions, such as the volume, operating mode, display, etc., can be controlled by a user through manipulation of the controls of the accessory 2, device 4 or receiver 8. Which particular controls to use to control which particular functions will be determined based upon the particular type of portable electronic device and remote receiver for which the accessory 2 and dock 6 are designed or configured. The dock 6 can also be provided with a display and user inputs if desired.

Figure 4:
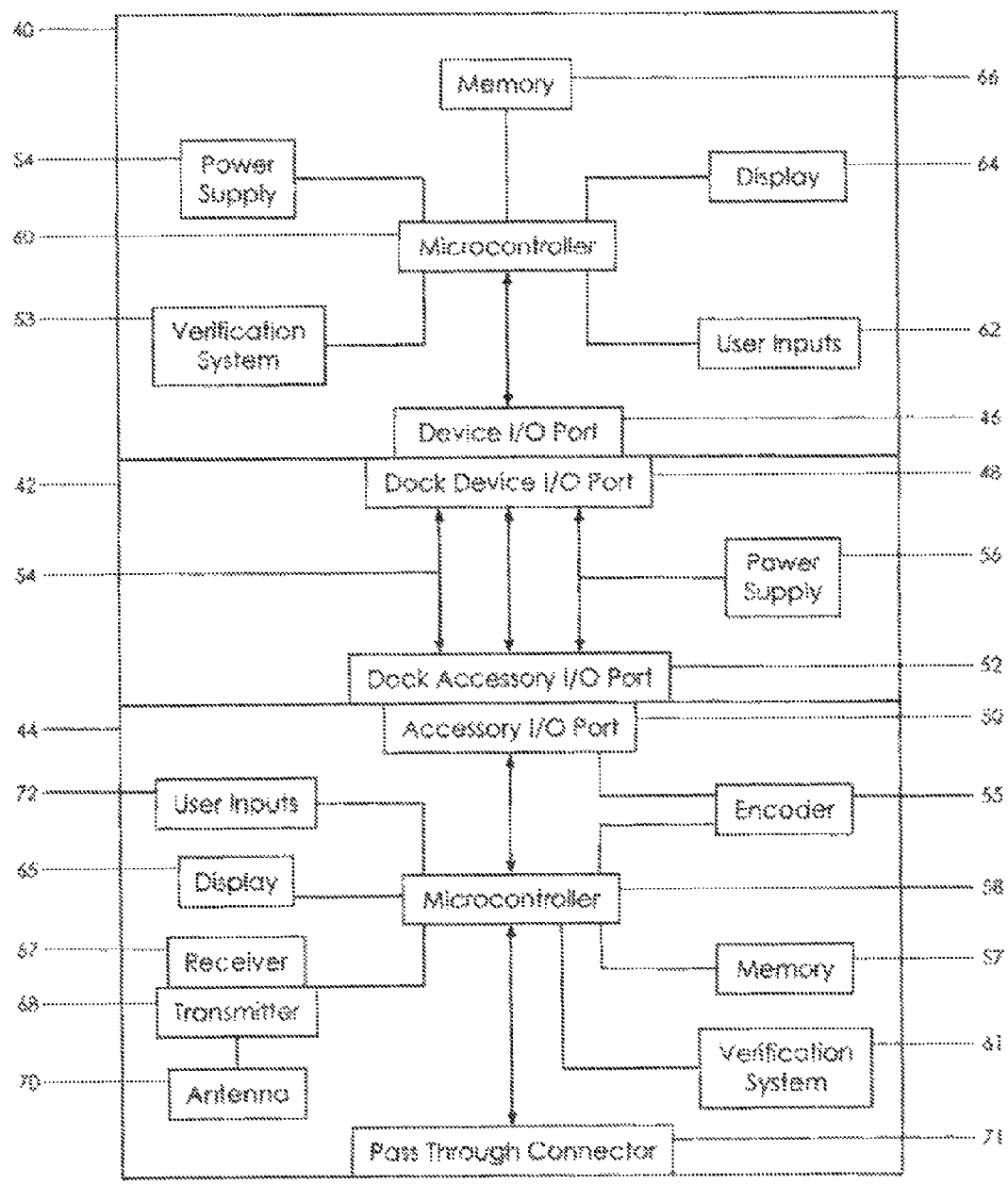
FIG. 4 is a functional block diagram of an accessory constructed in accordance with an embodiment of the present invention coupled to a portable electronic device through a dock.

Referring now to FIG. 4, a functional block diagram of an accessory 44 constructed in accordance with an embodiment of the present invention coupled to a portable electronic device 40 through a dock 42 is shown. The device 40 is coupled to the dock 42 through device input/output port 46 which mates with a dock device input/output port 48. The accessory 44 is coupled to the dock 42 through an accessory input/output 50 that mates with a dock accessory input/out port 52. A series of connection lines 54 provide electrical connections between selected pins of the dock device input/out port 48 and the dock accessory input/output port 52. The dock 42 provides power from a power supply 56 to the device 40 and the accessory 44 through the connections 46, 48, 50 and 52. The power supply 56 may be an internal power supply of the dock 42, such as a battery, or a connection to an external power supply, such as a 12-volt car outlet. Power conversion and conditioning circuitry may be included in the power supply 56 if necessary to provide appropriately conditioned power to the device 40 and accessory 44.

In the embodiment shown, the connections 54 between the device 40 and accessory 44 provided by the dock 42 include a digital data channel, an analog audio signal line and a power connection. Through these connections the accessory 44 exchanges digital data with the portable electronic device 40 through the dock 42. The various functions of the accessory 44 are controlled by a microcontroller 58 that communicates with the microcontroller 60 of the device 40 through the dock 42 when the device 40 and accessory 44 are coupled to the dock 42. By establishing digital communications between the controllers 58 and 60, the accessory 44 can exchange digital control information with the device 40. Thus, the accessory 44 can respond to manipulation of the user inputs 62 of the portable device 40 and display information on the display 64 of the device 40 as discussed in more detail herein. The accessory 44 can also read data from and write data to the memory 66 of the device 40. The digital data exchanged between the accessory 44 and device 40 may also include a digital media file and meta data concerning the digital media file.

The accessory 44 includes a transmitter 68 that transmits data to a remote receiver through an accessory antenna 70. The accessory 44 preferably receives an analog audio signal from the device 40 through the interfaces 46, 48, 50 and 52. The accessory 44 then uses an encoder 55 to create digital data corresponding to the analog audio signal received from the device 40. While the encoder 55 and the accessory microcontroller 58 are shown as separate elements in FIG. 2, those skilled in the art will recognize that the encoder 55 may be a separate circuit or included in the microcontroller 58. The digital transmitter 68 transmits the encoded audio signal to the remote receiver for decoding and broadcast by the remote receiver. The microcontroller 58 can be used to alter the transmit frequency or channel of the digital transmitter 68 in response to a user manipulating a user input 62 or 72. An additional analog FM transmitter can also be provided such that the accessory 44 can selectively handle transmission to both digital an analog remote receivers if desired.

The selected transmission frequency for the accessory is displayed on the display 65 of the accessory 44. An accessory 44 constructed in accordance with a preferred embodiment of the present invention also sends data to the portable electronic device 40 that instructs the portable electronic device to display the currently selected transmitter frequency or channel on the display screen 64 of the device 40. By utilizing the display 64 of the device 40, the cost of the components required to implement the accessory 44 is minimized. In addition, the accessory 44 can display menus on the display screen 64 on the device 40 and allow a user to manipulate the menus through the use of the controls 62 of the portable electronic device 40 to control the functions of the accessory 44.

Since the digital data should be received by the remote receiver 40 with no or minimal errors, no additional interference is introduced during the transmission process from the device 40 to the remote receiver. In such an embodiment, any alteration in the original signal will be a result of the encoding process which can be managed to limit the amount of allowable distortion of the original signal. If the device 40 is capable of outputting digital audio data to the accessory 44, the digital data may be transmitted directly to the remote receiver by the accessory 55 or have its format digitally altered by the digital encoder 55 if required for reception by the remote receiver.

The audio signal is preferably encoded as a digital radio signal in a format such as HD radio by the digital encoder 55 such that the output of the transmitter 68 can be received by a digital radio receiver. HD digital radio simultaneously transmits a digital version of the analog broadcast and a second digital channel which can be used for alternate radio programming or data services such as song information, weather reports and car navigation updates. HD digital radio transmits the digital channels in unused portions of the same AM and FM channels used for the old analog stations. The digital radio receiver can receive control data in data fields which can be used to control functions of the digital receiver and display messages from the digital broadcaster. Most often, these data fields are used to display program service data that consists of a number of different fields which are displayed on HD radio receivers, including: song title, program title, artist name, album name, and music genre. The accessory can repurpose these fields such that new information such as text messages, advertisements, logos, song lyrics, etc. from the device 40 or accessory 44 can be transmitted to the remote receiver and displayed on a display screen of the receiver. Custom messages can also be entered on the device 40 by the user and transmitted to the remote receiver for display if desired. Longer messages can be scrolled across the display of the HD receiver. Conversion codes and routines for converting device 40 outputs into receiver inputs, or vice versa, can be stored in the accessory memory 57. Thus, an embodiment of the present invention can be configured such that a user can receive text messages with their mobile phone and transmit the messages to the digital receiver such that the user can view their messages on the screen of their car stereo receiver.

The audio signal can also be encoded as a satellite radio signal by the digital encoder 55 such that the output of the digital transmitter 68 can be received by a satellite radio equipped receiver. A satellite radio transmitter typically operates in the "S" band (2.3 GHz) and provides Digital Audio Radio Service (DARS). In one embodiment, the accessory 44 includes logic and circuitry for analog satellite and HD radio capabilities such that a user can select between the transmission formats using the user inputs 62 and 72 of the device 40 or accessory 44.

A transmitting accessory 44 constructed in accordance with an embodiment of the present invention may also include a verification system 61 that cooperates with a verification system 53 in the device to verify that the accessory 44 is being used by an approved portable electronic device 40 or that the accessory 44 is an approved accessory for the device. The verification system 53 and 61 can use an identification resistor, a digital certificate, validation code or any other type of identification system or circuitry to verify that the device 40 and accessory 44 are produced by approved entities. Digital rights management software may also be included in the accessory 44 to verify the authenticity of any copyrighted material being transmitted from the device to the remote receiver by the accessory.

An accessory 44 constructed in accordance with an embodiment of the present invention also preferably includes a pass through connector 71 that allows a second accessory to couple to an output or input port of the electronic device 40 through the accessory 44. For example, the accessory may have a USB port that allows an external device to be coupled through the accessory to the USB port of the digital music player if the accessory covers the USB port of the device when it is coupled to the device. Alternatively, the pass through connector 71 can be used to supply power to the device 40 through the accessory 44 or couple an accessory having a different type of I/O port 50 than the I/O port 46.

The accessory 44 and device 40 can be powered in a number of different manners depending upon the configuration of the device 40 to which the accessory 44 is adapted to be coupled. The accessory 44 may be a parasitic device that takes its power from the power supply 54 of the portable electronic device 40 if the device power supply 54 is capable of supplying the power required by the digital circuitry of the accessory 44. However, the accessory may contain an internal power source for powering the accessory and charging the portable electronic device 40. An external power supply connection 56 may be coupled to the portable electronic device 40 and accessory 44 through the dock 42 if desired. This allows the device 40 to be charged while it is coupled to the accessory 44 through the dock 42 such that the accessory 44 can be used while the device 40 is being charged. In addition, the external power connection 56 provides the increased power required by the accessory's 44 digital circuitry without draining the power supply 54 of the device 40.

The accessory 44 most preferably has a receiver 67 that can receive analog or digital data from a remote transmitter. Thus, the accessory can be used to receive radio signals and couple the radio signals to the portable electronic device. Also, if the remote transmitter has digital data transmission capabilities, digital information can be downloaded through the accessory to the device using a wireless format such as Bluetooth or Wi-fi. The capabilities of the accessory receiver will be determined by the capabilities of the transmitter. Such an embodiment of the present invention can push advertisements from a digital car stereo to a media player, laptop or cellular phone. If GPS capabilities are provided in either the accessory or the radio, the advertisements can be sent in a location sensitive manner. This would allow coupons for a restaurant to be offered to a motorist passing the restaurant in a contemporaneous fashion.

Figure 5:
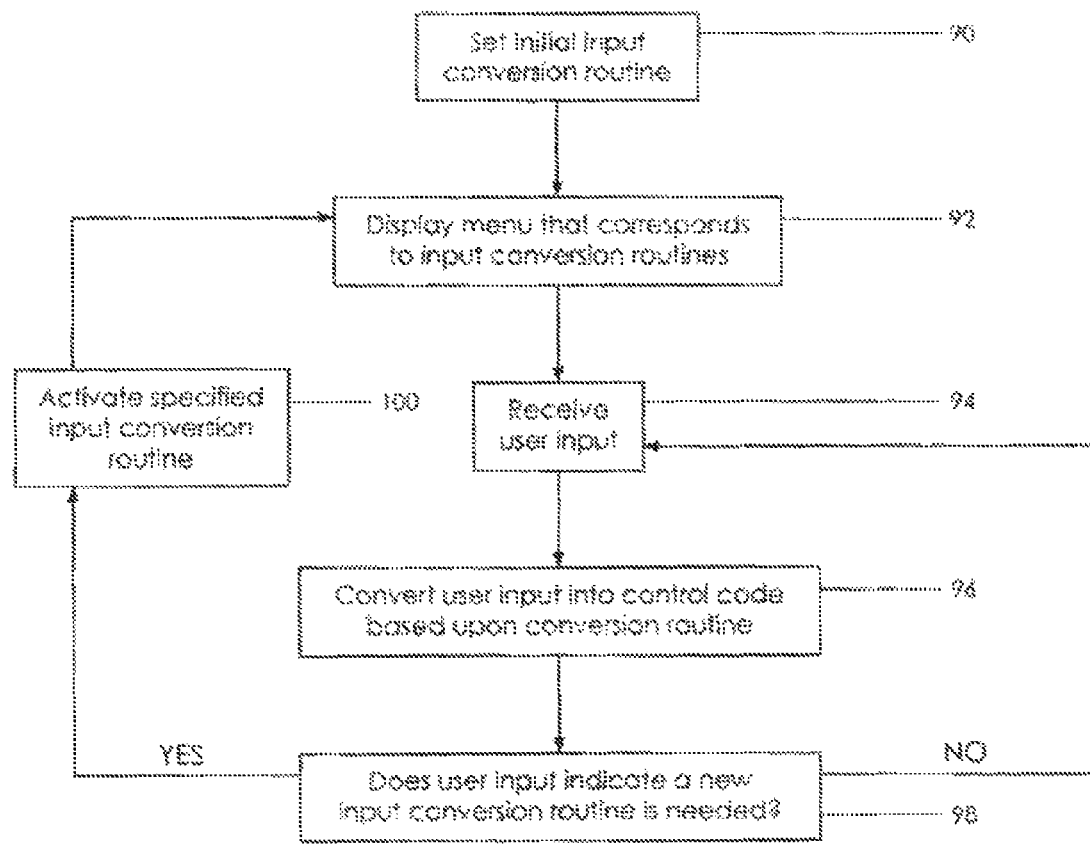
FIG. 5 is a flow chart of a method of repurposing the keys of an accessory constructed in accordance with an embodiment of the present invention.

Referring now to FIG. 5, a flow chart of a method of repurposing the controls of an accessory constructed in accordance with an embodiment of the present invention is shown. The method begins in step 90 with the accessory setting an initial input conversion routine upon start up. In step 92, a menu is displayed on the screen of the accessory that corresponds to the initial input conversion routine. The menu prompts a user to make a selection using the user inputs of the accessory. The menu preferably specifies the functions of the user inputs such that the user can easily determine the accessory functions controlled by the user inputs in the current configuration. When the accessory receives a user input as illustrated in step 94, the accessory converts the input into an accessory control code based upon the initial conversion routine in step 96. If the user input indicates that the function of the accessory inputs should be altered in decision step 98, the method proceeds to step 100 wherein the accessory loads an input conversion routine that corresponds to the desired reconfiguration of the user inputs. The method then returns to step 92 wherein a new menu that corresponds to the selected conversion routine is displayed by the accessory. If no new input conversion routine is required, the method returns to step 94 wherein the accessory waits to receive a user input. Thus, the controls are soft controls that can be reconfigured to perform any desired functions. By repurposing the controls of the accessory with software, the accessory can be constructed from fewer components. This results in accessory that is less bulky and expensive and more reliable. Critical features for a successful accessory.

The accessory can also preferably detect manipulation of at least some of the controls of the device and an input conversion routine of the accessory used to repurpose the device control data into accessory control data. While the flow chart of FIG. 5 is directed toward a method of repurposing the accessory's controls, any type of control signals can be repurposed in accordance with the present invention. For example, the tuning controls of the device can be repurposed to control the tuning band/range of an accessory's transmitter to enable geographic localization of the transmitter's band/range or pre-emphasis settings for different geographic areas such as Japan, the European Union and the United States. The device's volume control can be also used to control the output level of the accessory's transmitter. When the volume output is adjusted through the device's interface, the accessory can attenuate its output so that the volume level of the accessory moves up or down at the same rate as the device. As yet another example, seekup and seekdown device controls can be repurposed to control a seekup and seekdown function for the accessory transmitter. Similarly, the mono/stereo reception control of the device can control the mono/stereo transmitter transmission modes. As yet further examples, the presets on the device can function as presets for the accessory transmitter and the device's On/Sleep/Off commands can place the accessory into corresponding modes.

It is important to note that the controls of the device may be repurposed for other entirely different accessory controls. A single control may cause several device changes to occur, e.g., altering a regional control setting may alter the accessory's transmitter's frequency range, power, and pre-emphasis. In such situations, the controls are repurposed through macros stored in the accessory memory that convert the device control into the desired combination of accessory settings. Those skilled in the art will appreciate, in light of the present disclosure, that the controls of the device or accessory can be used to control any desired function of the accessory.

A preferred embodiment of the present invention can also use the display screen of the attached electronic device to display images received from the accessory. Furthermore, by detecting manipulation of the device controls, the device controls can be repurposed to control the images produced by the accessory and displayed on the screen of the device. For example, the high resolution LCD on a portable media player, i.e. an Apple iPod™, can be used to display dynamic information and images sent to it by an accessory such as an FM transmitter. Such an embodiment receives inputs from the device's user interface and then writes changes in the accessories configuration to the device's screen such that accessory can utilize both the screen and controls of the device to which it is coupled. This further decreases the cost and complexity of the accessory, thereby making it a much more economically attractive and reliable embodiment.

Figure 6:
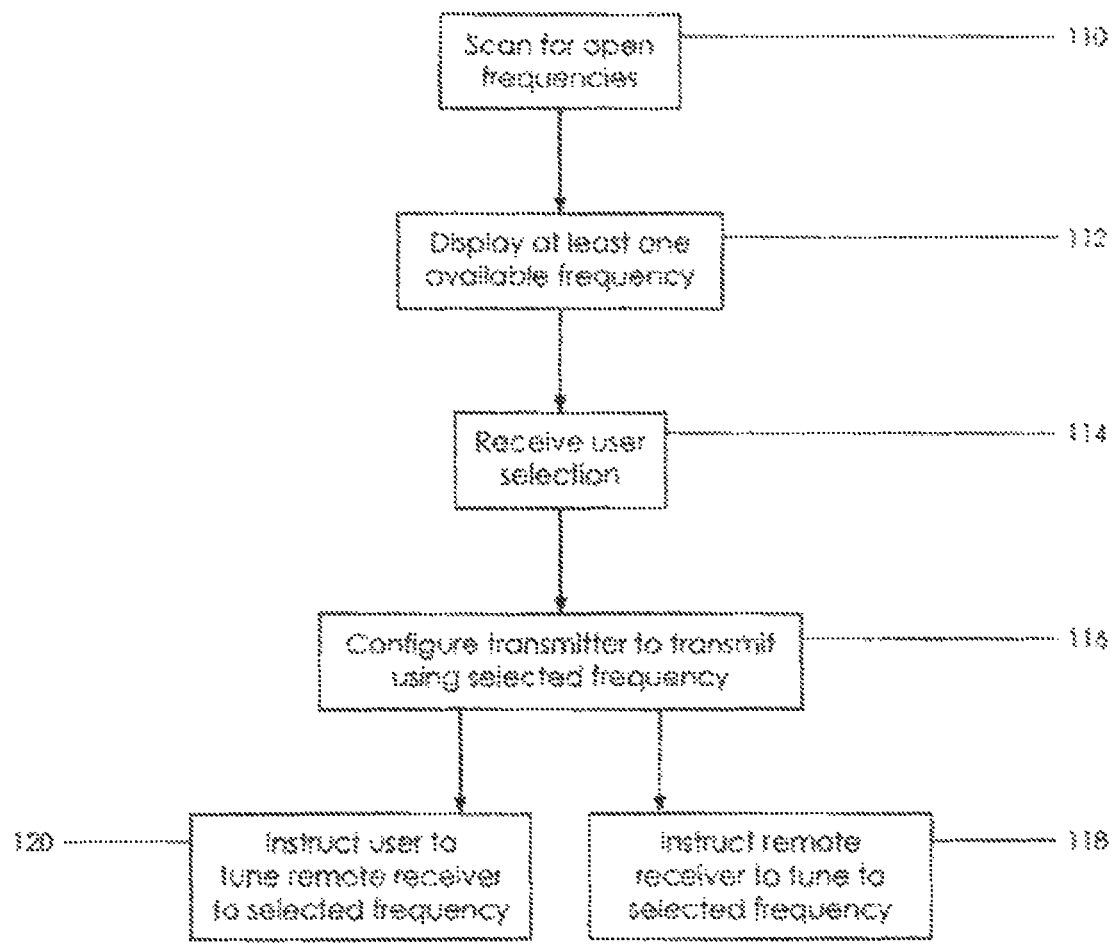
FIG. 6 is a flow chart of a method of automatically configuring a digital radio with an accessory constructed in accordance with an embodiment of the present invention

FIG. 6 is a flow chart of a method of automatically configuring a digital radio to tune to a particular frequency with an accessory constructed in accordance with an embodiment of the present invention. The method commences in step 110 with the accessory scanning the available stations or channels for an open frequency. The accessory then displays at least one available frequency such that a user can select a desired open frequency for the transmission in step 112. These can preferably be stored in presets for later reference and selection through the user inputs. In step 114, the accessory receives the user selection and proceeds to step 116 wherein the accessory's transmitter is configured to use the selected frequency. In step 118, the accessory preferably instructs the remote receiver to tune to the selected frequency. Alternatively, the user can be instructed to tune to the selected channel as shown in step 120. For a typical digital radio this would be accomplished through the use of RDS data. However, the protocol used to reconfigure the remote receiver will of course be dependent upon the type of receiver with which the transmitting accessory is designed to work and its remote configuration capabilities.

Although there have been described particular embodiments of the present invention of a new and useful ACCESSORY FOR PORTABLE ELECTRONIC DEVICE, it is not intended that such references be construed as limitations upon the scope of this invention except as set forth in the following claims.

What is claimed is:

1. An accessory for coupling with a portable electronic device, said accessory comprising:
   a body adapted to fit in a 12-volt outlet having a mounting portion extending outward from said body;
   a dock connected to said body that is adapted to couple to said portable electronic device such that said portable electronic device is held in an upright position and electrical signals can be received from said portable electronic device with said dock; and
   an FM transmitter adapted to be coupled to said dock while said portable electronic device is coupled to said dock such that said FM transmitter can transmit data received by said dock from said portable electronic device to a remote receiver when said portable electronic device is coupled to said dock;
   wherein said FM transmitter can be decoupled from said dock and coupled directly to said portable electronic device when said portable electronic device is decoupled from said dock such that said FM transmitter can transmit data received from said portable electronic device to said remote receiver;
   wherein said FM transmitter detects manipulation of a user input of said portable electronic device and alters a broadcast frequency of said FM transmitter based u on said detected manipulation; and
   wherein said FM transmitter configures said portable electronic device to display a transmission frequency of said accessory on a display of said portable electronic device.

2. The accessory of claim 1 wherein said dock is adapted to receive power from said 12-volt outlet and charge said portable electronic device when said portable electronic device is coupled to said dock.

3. The accessory of claim 1 wherein said FM transmitter is a digital transmitter that transmits a digital signal in an HD digital radio format.

4. The accessory of claim 1 wherein a housing of the FM transmitter is configured to be physically coupled to a housing of the portable electronic device such that the portable electronic device and the accessory can be carried as a single unit.

5. The accessory of claim 1 wherein a set of user inputs on said transmitter can be repurposed to control more than one function of said transmitter.

6. The accessory of claim 1 wherein said FM transmitter is a parasitic device that obtains power from said portable electronic device when said FM transmitter is coupled to said portable electronic device.

7. The accessory of claim 1 wherein said transmitter configures said remote receiver to receive data on a particular channel or station.

8. An accessory for use with a portable electronic device, said accessory comprising:
   a base having a first input/output connector adapted to receive said portable electronic device and hold said portable electronic device in an upright position and a second input/output connector;
   a 12-volt adapter configured to be received in a in a 12-volt car outlet connected to said base; and
   a transmitter having an input/output connector such that said transmitter can be indirectly coupled to said portable electronic device through said second input/output connector on said base when said portable electronic device is coupled to said base and directly connected to said portable electronic device when said portable electronic device is decoupled from said base;
   wherein said transmitter receives an audio signal from said portable electronic device corresponding to music being played on said portable electronic device and broadcast a broadcast radio frequency signal corresponding said audio signal to a broadcast frequency radio receiver; and
   wherein said transmitter detects manipulation of a user input of said portable electronic device and alters a broadcast frequency of said transmitter based upon said detected manipulation; and
   where said transmitter configures said portable electronic device to display a transmission frequency of said accessory on display of said portable electronic device.

9. The accessory of claim 8 wherein said transmitter receives data from said portable electronic device and transmits said data to a remote receiver.

10. The accessory of claim 8 wherein when the transmitter is directly coupled to said portable electronic device, the portable electronic device and transmitter can be carried as a single unit.

11. The accessory of claim 8 wherein said transmitter comprises user inputs that allow a user to select a transmission frequency of said transmitter.

* * * * *